Sept. 5, 1950          F. F. WEBER          2,521,616
ARTIFICIAL FISH BAIT AND FISH LURE
AND METHOD OF MAKING THE SAME
Filed Aug. 13, 1948

Frank F. Weber
INVENTOR.

BY *Clarence A. O'Brien
and Harvey B. Jacobson*
Attorneys

Patented Sept. 5, 1950

2,521,616

UNITED STATES PATENT OFFICE 2,521,616

ARTIFICIAL FISH BAIT AND FISH LURE AND METHOD OF MAKING THE SAME

Frank F. Weber, Yorkville, Ill.

Application August 13, 1948, Serial No. 44,078

4 Claims. (Cl. 43—42.24)

1

In fishing with live bait, especially with worms, the bait will not stay upon the fish hook, and piercing the bait by the hook kills or mutilates the bait, so that the fisherman must be continually putting new bait on the hook.

An object of the present invention, therefore, is to provide a novel method by which a durable natural appearing artificial bait may be made and effectively mounted upon a fish hook.

Further objects are to provide a novel method of making an artificial bait or lure, and to provide the bait with a taste which will tend to make fish bite the bait.

Another object is to provide an artificial bait which will stay on the fish hook and entice the fish to bite.

Still another object is to provide an artificial worm which will wiggle in the water, and which will be so durable as to last a long time in actual fishing.

A still further object is to provide a novel fish lure composed of a fish hook and a novel artificial worm thereon.

The exact nature of the present invention will become apparent from the following description when considered in connection with the accompanying drawing, in which.

Figure 1:
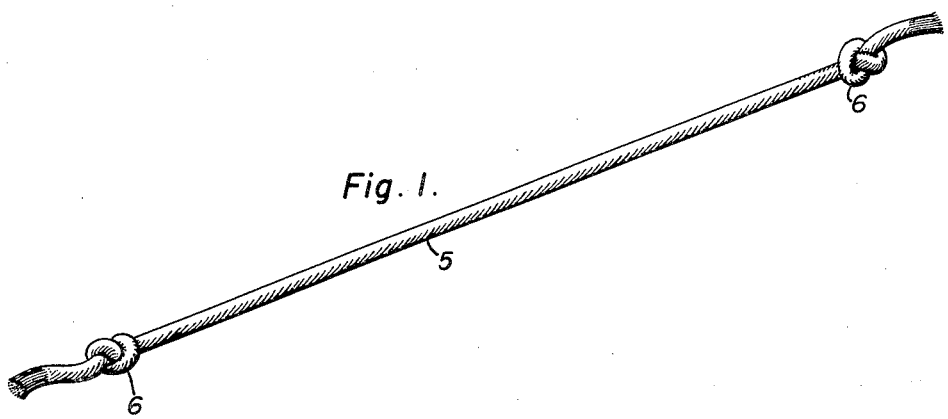
Figure 1 is an enlarged perspective view of an imitation worm embodying the present invention.

Referring in detail to the drawing, the present invention comprehends the provision of an artificial fish bait comprising a member 5 which is of a form to somewhat resemble a natural fish bait and which is made of absorbent textile material, said member being suitably colored and being impregnated or saturated with material which is tasty to fish. The bait illustrated is an imitation worm made of a suitable length of suitable colored yarn saturated with tasty juice of fish, liver, or the like, and having a knot 6 tied therein near each end thereof.

Figure 2:
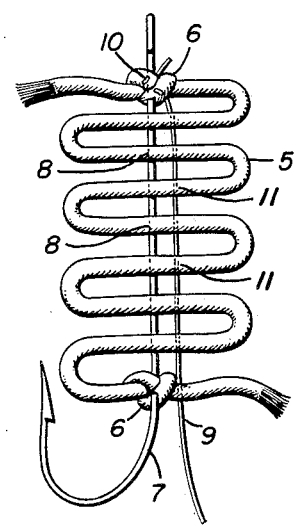
Figure 2 is a side elevational view showing initial steps in mounting the worm of Figure 1 on a fish hook to make a fish lure in accordance with the present invention.

In using the worm of Figure 1 to make a fish lure, the pointed end of an ordinary fish hook 7 is passed through one of the knots 6, and then several times through the yarn at regular intervals as at 8, and then through the other knot 6 until the worm is mounted on the shank of the fish hook in serpentine form as shown in Figure 2. The worm is then bunched and moved toward

Figure 3:
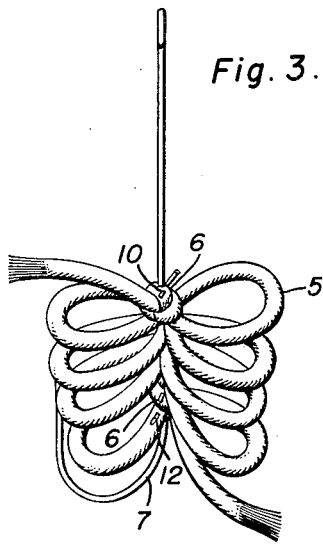
Figure 3 is a view similar to Figure 2 showing a subsequent step in making the fish lure.

2 and into the bend or curve of the fish hook as indicated in Figure 3. The latter operation may be effected by attaching an end of a string or thread 9 to the first knot as at 10, then threading said cord or thread through the several folds of the worm adjacent the shank of the fish hook by means of a needle or the like as at 11, and then pulling on the free end of said cord or thread and securing it to the second knot as at 12.

My artificial worm may be pierced by the fish hook without any serious detrimental effect and the worm will effectively remain on the hook. The material of which the worm is made is so soft and flexible that the free ends will wiggle to produce results similar to those produced by a natural worm. The member 5 may be impregnated or saturated before or after mounting it on the hook.

From the foregoing description, it is believed that the nature and advantages of the present invention will be readily understood and appreciated by those skilled in the art. While I have illustrated merely by way of example an embodiment of the invention involving an imitation worm, it will be apparent that the invention comprehends production of other forms of imitation bait and the use thereof with a fish hook in producing a fish lure.

Having described the invention, what is claimed as new is:

1. The method of making a fish lure comprising tying a knot in a length of colored yarn near each end thereof to provide a member somewhat resembling a worm, and passing the pointed end of a fish hook through one of the knots, then several times through the member at regular intervals, and then through the other knot.

2. The method of making a fish lure comprising tying a knot in a length of colored yarn near each end thereof to provide a member somewhat resembling a worm, and passing the pointed end of a fish hook through one of the knots, then several times through the member at regular intervals, and then through the other knot until the member is mounted on the shank of the hook in serpentine form, and then bunching and moving the member toward and partly into the space between the shank and the pointed end of the hook.

3. The method of making a fish lure comprising tying a knot in a length of colored yarn near each end thereof to provide a member somewhat resembling a worm, passing the pointed end of a fish hook through one of the knots, then several times through the member at regular intervals, and then through the other knot until the member is mounted on the shank of the hook in serpentine form, attaching an end of a thread to the one knot and threading it through the several folds of said member adjacent the shank of the hook, then pulling on the other end of the thread to bunch and move the member toward and partly into the space between the shank and the pointed end of the hook, and then securing the thread to the other knot.

4. A fish lure comprising a fish hook, and an artificial worm comprising a length of colored yarn having a knot near each end thereof, said hook passing through the knots and several times through the yarn at regular intervals between the knots and intermediate the folds of the yarn, the yarn being bunched on the hook and partly projecting into the space between the shank and the pointed end of said hook.

FRANK F. WEBER.

REFERENCES CITED

The following references are of record in the file of this patent:

UNITED STATES PATENTS

| Number | Name | Date |
| --- | --- | --- |
| 185,914 | Gregg | Jan. 2, 1877 |
| 1,010,481 | Crane | Dec. 5, 1911 |
| 1,418,229 | Buddle | May 30, 1922 |
| 1,922,841 | Cooley | Aug. 15, 1933 |
| 2,091,457 | Sauer | Aug. 31, 1937 |
| 2,216,929 | Zander et al. | Oct. 6, 1940 |
| 2,306,181 | Neumann | Dec. 22, 1942 |
| 2,323,318 | Farkas | July 6, 1943 |